United States Patent
Denoual et al.

(10) Patent No.: US 11,575,951 B2
(45) Date of Patent: Feb. 7, 2023

(54) METHOD, DEVICE, AND COMPUTER PROGRAM FOR SIGNALING AVAILABLE PORTIONS OF ENCAPSULATED MEDIA CONTENT

(71) Applicant: CANON KABUSHIKI KAISHA, Tokyo (JP)

(72) Inventors: Franck Denoual, Saint Domineuc (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/437,384

(22) PCT Filed: Mar. 2, 2020

(86) PCT No.: PCT/EP2020/055464
§ 371 (c)(1),
(2) Date: Sep. 8, 2021

(87) PCT Pub. No.: WO2020/182524
PCT Pub. Date: Sep. 17, 2020

(65) Prior Publication Data
US 2022/0150557 A1    May 12, 2022

(30) Foreign Application Priority Data
Mar. 12, 2019  (GB) ..................... 1903394

(51) Int. Cl.
*H04N 21/235*    (2011.01)
*H04N 21/435*    (2011.01)
(Continued)

(52) U.S. Cl.
CPC ..... *H04N 21/2358* (2013.01); *H04N 21/4358* (2013.01); *H04N 21/84* (2013.01); *H04N 21/8456* (2013.01)

(58) Field of Classification Search
CPC .......... H04N 21/2358; H04N 21/4358; H04N 21/84; H04N 21/8456; H04N 21/26258; H04N 21/85406; H04N 21/23439
See application file for complete search history.

(56) References Cited

U.S. PATENT DOCUMENTS

2012/0185607 A1   7/2012  Rhyu et al.
2020/0288217 A1*  9/2020  Takahashi .......... H04N 21/8456

FOREIGN PATENT DOCUMENTS

WO    2018/069357 A1    4/2018

OTHER PUBLICATIONS

Jean Le Feuvre, et al., Further Inputs on Preselection (Dul), International Organisation for Standardisation, ISO/IEC JTC1/SC29/WG11 MPEG2018, Coding of Moving Pictures and Audio, Oct. 2018, 6 pages, Macao, CN, Doc. No. m44772.

(Continued)

*Primary Examiner* — Anthony Bantamoi
(74) *Attorney, Agent, or Firm* — Canon U.S.A., Inc. IP Division

(57) ABSTRACT

A method for providing media content by a server, the media content comprising media components, each media component comprising initialization data and media data, the method being carried out by the server for a preselection of a plurality of media components, obtaining an indication of which initialization data of the plurality of media components should be used by a client to process media data of the media components of the preselection; and describing the preselection in a media presentation description, the description of the preselection comprising references to each media component of the plurality of media components and the obtained indication.

16 Claims, 11 Drawing Sheets

(51) Int. Cl.
H04N 21/84 (2011.01)
H04N 21/845 (2011.01)

(56) References Cited

OTHER PUBLICATIONS

Franck Denoual, et al., Guidelines for DASH on Multi-track Content, International Organisation for Standardisation, ISO/IEC JTC1/SC29/WG11 MPEG2019, Coding of Moving Pictures and Audio, Jan. 2019, 4 pages, Marakesh, MA, Doc. No. M46119.
Revised text of ISO/IEC FDIS 23009-1, draft 3rd edition, 220 pages, Retrieved from the Internet: URL:http://phenix.int-evry.fr/mpeg/doc_end_user/documents/123_Ljubljana/wg11/w17813.zip23009-1-3ed-FDIS.docx, retrieved on Jul. 26, 2018.

* cited by examiner

```
<MPD ....>
 <Period...>
  <AdaptationSet id="1 ...>          405-1
   <Representation id="10"  ... >
    <SegmentTemplate initialization="url100.mp4" media = "url150$time$.mp4"... />
   </Representation>
  </AdaptationSet >
  <AdaptationSet id="2" ...>          405-2
   <Representation id="20" ... >
    <SegmentTemplate initialization="url200.mp4" media= "url250$time$.mp4"... />
   </Representation>
  </AdaptationSet >
  <AdaptationSet id="3" ...>          405-3
   <Representation id="30"" ... >
    <SegmentTemplate initialization="url300.mp4" media = "url350$time$.mp4"... />
   </Representation>
  </AdaptationSet >
  <Preselection id="P1" preselectionComponents="1 2 3"/>
 </Period>
</MPD>
```

```
<MPD ....>
 <Period...>
  <AdaptationSet id="1 ...>           605-1
   <Representation id="10" ... >                                625-1
    <SegmentTemplate initialization="url100.mp4" media = "url150.mp4"... />
   </Representation>
  </AdaptationSet >
  <AdaptationSet id="2" ...>          605-2
   <Representation id="20" ... >
    <SegmentTemplate initialization="url200.mp4" media = "url250.mp4"... />
   </Representation>
  </AdaptationSet >
  <AdaptationSet id="3" ...>          605-3
   <Representation id="30"" ... >                               625-3
    <SegmentTemplate initialization="url300.mp4" media = "url350.mp4"... />
   </Representation>
  </AdaptationSet >
  <Preselection id="P1" preselectionComponents="1 2 3" init="AS_only"/>
 </Period>
</MPD>          610                                615
```

600

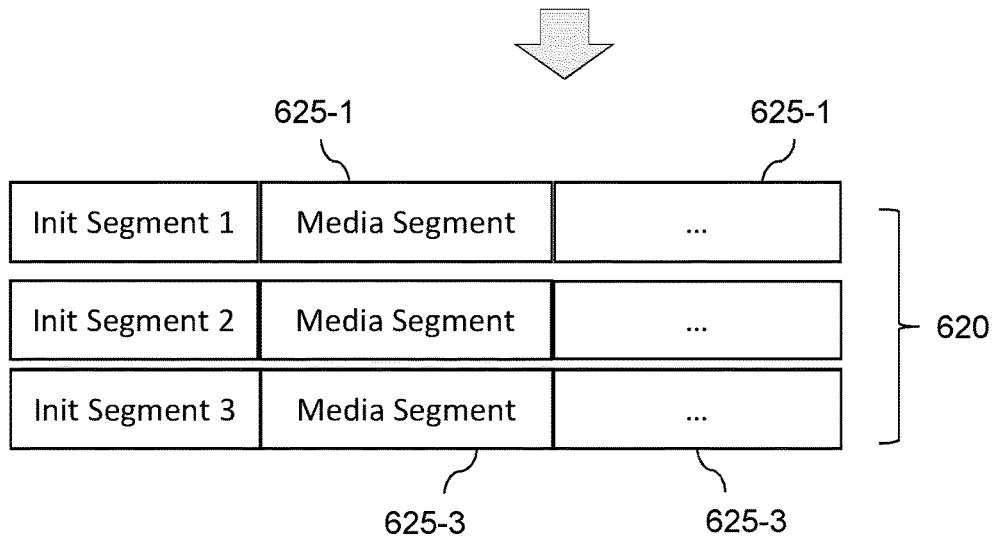

Fig. 6

```
<MPD ....>
 <Period...>                  ┌ 705-1
  <AdaptationSet id="1" ...>
   <Representation id="10" ... >                              725-1
    <SegmentTemplate initialization="url100.mp4" media = "url150$time$.mp4"... />
   </Representation>
  </AdaptationSet >           ┌ 705-2
  <AdaptationSet id="2" ...>
   <Representation id="20" ... >                              725-2
      <SegmentTemplate initialization="url200.mp4" media = "url250$time$.mp4" />
   </Representation>
  </AdaptationSet >           ┌ 705-3
  <AdaptationSet id="3" ...>
   <Representation id="30"" ... >                             725-3
    <SegmentTemplate initialization="url300.mp4" media = "url350$time$.mp4" ... />
   </Representation>
  </AdaptationSet >
  ┌─────────────────────────────────────────────────────────────────┐
  │ <Preselection id="P1" preselectionComponents="1 2 3"            │
  │ init="preselect_or_AS"/>                                        │
  └─────────────────────────────────────────────────────────────────┘
 </Period>
</MPD>      715            710
```

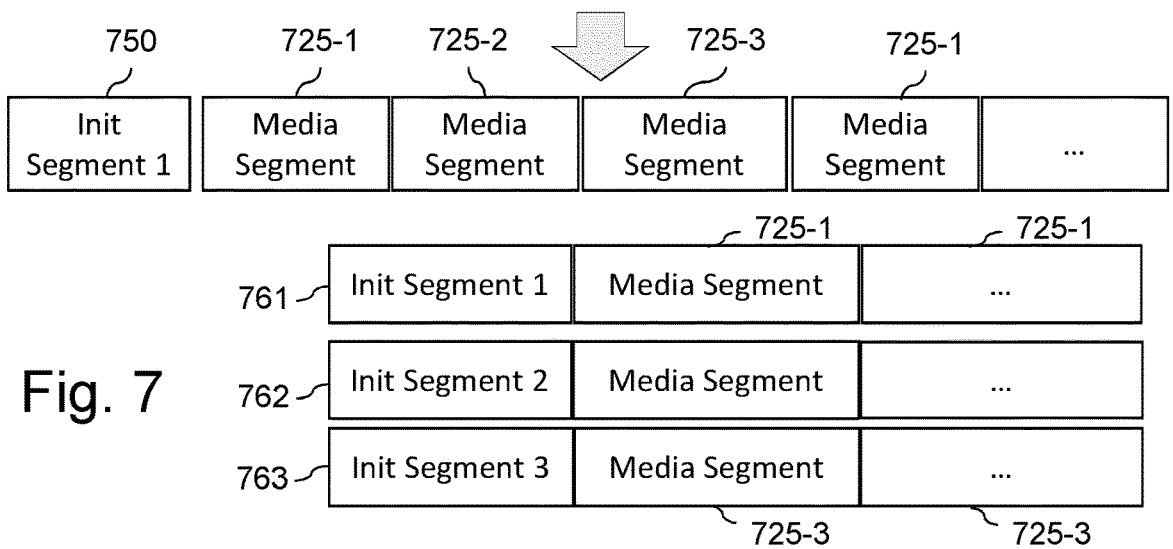

Fig. 7

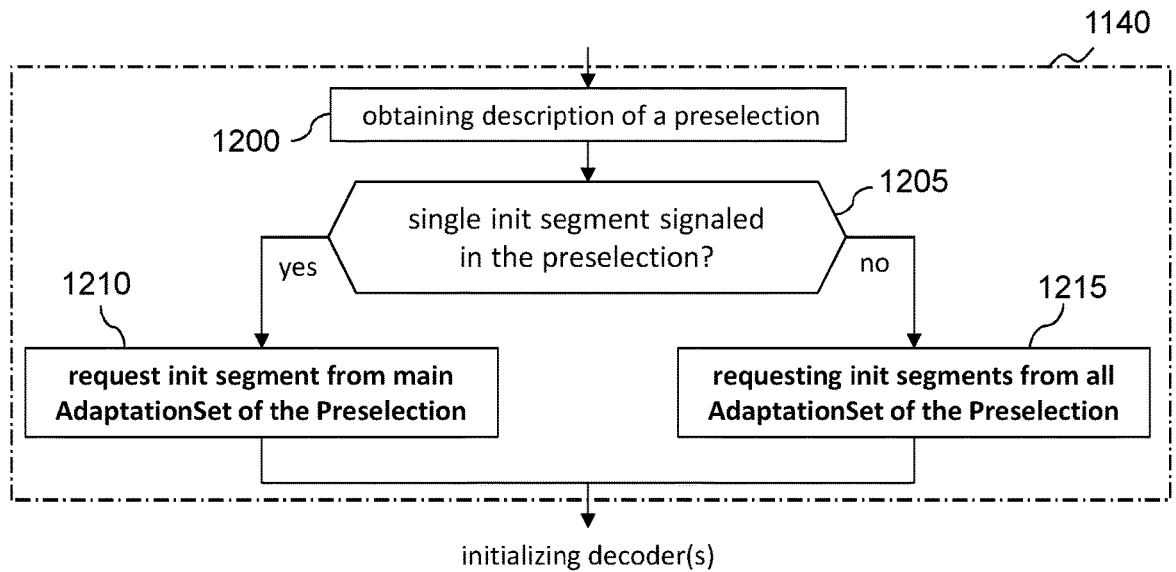

METHOD, DEVICE, AND COMPUTER PROGRAM FOR SIGNALING AVAILABLE PORTIONS OF ENCAPSULATED MEDIA CONTENT

CROSS REFERENCE TO RELATED APPLICATION

This application is the National Phase application of PCT Application No. PCT/EP2020/055464, filed on Mar. 2, 2020, and titled "Method, Device, and Computer Program for Signaling Available Portions of Encapsulated Media Content". This application claims the benefit under 35 U.S.C. § 119(a)-(d) of United Kingdom Patent Application No. GB1903394.3, filed on Mar. 12, 2019 and entitled "Method, Device, and Computer Program for Signaling Available Portions of Encapsulated Media Content". The above cited patent applications are incorporated herein by reference in their entirety.

FIELD OF THE INVENTION

The present invention relates to a method, a device, and a computer program for signaling available portions of encapsulated media content, making it possible to optimize transmission of portions of encapsulated media content.

BACKGROUND OF THE INVENTION

The invention relates to encapsulating, parsing, and streaming media content, e.g. according to ISO Base Media File Format as defined by the MPEG standardization organization, to provide a flexible and extensible format that facilitates interchange, management, editing, and presentation of group of media content and to improve its delivery for example over an IP network such as the Internet using adaptive http streaming protocol.

The International Standard Organization Base Media File Format (ISO BMFF, ISO/IEC 14496-12) is a well-known flexible and extensible format that describes encoded timed media data bit-streams either for local storage or transmission via a network or via another bit-stream delivery mechanism. This file format has several extensions, e.g. Part-15, ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), or L-HEVC (Layered HEVC). This file format is object-oriented. It is composed of building blocks called boxes (or data structures, each of which being identified by a four character code) that are sequentially or hierarchically organized and that define descriptive parameters of the encoded timed media data bit-stream such as timing and structure parameters. In the file format, the overall presentation over time is called a movie. The movie is described by a movie box (with four character code 'moov') at the top level of the media or presentation file. This movie box represents an initialization information container containing a set of various boxes describing the presentation. It may be logically divided into tracks represented by track boxes (with four character code 'trak'). Each track (uniquely identified by a track identifier (track_ID) represents a timed sequence of media data pertaining to the presentation (frames of video, for example). Within each track, each timed unit of data is called a sample; this might be a frame of video, audio or timed metadata. Samples are implicitly numbered in sequence. The actual samples data are in boxes called Media Data Boxes (with four character code 'mdat') at the same level as the movie box. The movie may also be fragmented, i.e. organized temporally as a movie box containing information for the whole presentation followed by a list of movie fragment and Media Data box pairs. Within a movie fragment (box with four-character code 'moof') there is a set of track fragments (box with four character code 'traf'), zero or more per movie fragment. The track fragments in turn contain zero or more track run boxes ('trun'), each of which documents a contiguous run of samples for that track fragment.

Media data encapsulated with ISOBMFF can be used for adaptive streaming with HTTP. For example, MPEG DASH (for "Dynamic Adaptive Streaming over HTTP") and Smooth Streaming are HTTP adaptive streaming protocols enabling segment or fragment based delivery of media files. The MPEG DASH standard (see "ISO/IEC 23009-1, Dynamic adaptive streaming over HTTP (DASH), Part1: Media presentation description and segment formats") makes it possible to establish a link between a compact description of the content(s) of a media presentation and the HTTP addresses (e.g. URLs). Usually, this association is described in a file called a manifest file or description file. In the context of DASH, this manifest file is a file also called the MPD file (for Media Presentation Description). When a client device gets the MPD file, the description of each encoded and deliverable version of media content can easily be determined by the client. By reading or parsing the manifest file, the client is aware of the kind of media content components proposed in the media presentation and is aware of the HTTP addresses for downloading the associated media content components. Therefore, it can decide which media content components to download (e.g. via HTTP requests) and to play (decoding and playing after reception of the media data segments). DASH defines several types of segments, mainly initialization segments, media segments, or index segments. Initialization segments contain setup information and metadata describing the media content, typically at least the 'ftyp' and 'moov' boxes of an ISOBMFF media file. A media segment contains the media data. It can be for example one or more 'moof' plus 'mdat' boxes of an ISOBMFF file or a byte range in the 'mdat' box of an ISOBMFF file. A media segment may be further subdivided into sub-segments (also corresponding to one or more complete 'moof' plus 'mdat' boxes). The DASH manifest may provide segment URLs or a base URL to the file with byte ranges to segments for a streaming client to address these segments through HTTP requests.

FIG. 1 illustrates an example of streaming media data from a server to a client.

As illustrated, a server 100 comprises an encapsulation module 105 connected, via a network interface (not represented), to a communication network 110 to which is also connected, via a network interface (not represented), a de-encapsulation module 115 of a client 120.

Server 100 processes data, e.g. video and/or audio data, for streaming or for storage. To that end, server 100 obtains or receives data comprising, for example, an original sequence of images 125, encodes the sequence of images into media data (i.e. bit-stream) using a media encoder (e.g. video encoder), not represented, and encapsulates the media data in one or more media files or media segments 130 using encapsulation module 105. Encapsulation module 105 comprises at least one of a writer or a packager to encapsulate the media data. The media encoder may be implemented within encapsulation module 105 to encode received data or may be separate from encapsulation module 105.

Client 120 is used for processing data received from communication network 110, for example for processing media file 130. After the received data have been de-encapsulated in de-encapsulation module 115 (also known as a parser), the de-encapsulated data (or parsed data), corresponding to a media data bit-stream, are decoded, forming, for example, audio and/or video data that may be stored, displayed or output. The media decoder may be implemented within de-encapsulation module 115 or it may be separate from de-encapsulation module 115. The media decoder may be configured to decode one or more video bit-streams in parallel.

It is noted that media file 130 may be communicated to de-encapsulation module 115 into different ways. In particular, encapsulation module 105 may generate media file 130 with a media description (e.g. DASH MPD) and communicates (or streams) it directly to de-encapsulation module 115 upon receiving a request from client 120.

For the sake of illustration, media file 130 may encapsulate media data (e.g. encoded audio or video) into boxes according to ISO Base Media File Format (ISOBMFF, ISO/IEC 14496-12 and ISO/IEC 14496-15 standards).

FIG. 2 illustrates an example of streaming DASH segments for a Representation selected by a client.

According to DASH and as illustrated, when a client selects a Representation for streaming (for example client 120 in FIG. 1), it requests an initialization segment, for example InitializationSegment 205. For the sake of illustration, when media data are encapsulated according to the ISO Base Media File Format (ISO/IEC 14496-12), the Initialization Segment consists in a 'moov' box and its sub-boxes.

Upon reception of the items of information contained in the Initialization Segment, the client setup its media decoder(s) (that may be parts of de-encapsulation module 115 described by reference to FIG. 1). Once setup is done, the client requests the data segments corresponding to the selected Representation, for example MediaSegments 210-1 and 210-2, that are streamed by the server on a segment-basis. According to example 200, the media segments have a duration equal to "Delta_t". It is up to the client to issue the request at appropriate time so that the media plays smoothly from one segment (e.g. 210-1) to another (e.g. 210-2)

By definition, the concatenation 200 of InitializationSegment 205 followed by one or more media segments such as MediaSegments 201-1 and 210-2, results in a conforming (or compliant) bit-stream.

While these file formats and these methods for requesting and transmitting media data have proven to be efficient, there is a continuous need to improve selection of the data to be sent to a client and to improve signaling of the sent data for reducing the requested bandwidth and for facilitating data de-encapsulation and decoding by the client.

The present invention has been devised to address one or more of the foregoing concerns.

SUMMARY OF THE INVENTION

According to a first aspect of the invention there is provided a method for providing media content by a server, the media content comprising media components, each media component comprising initialization data and media data, the method being carried out by the server and comprising:

for a preselection of a plurality of media components, obtaining an indication of which initialization data of the plurality of media components should be used by a client to process media data of the media components of the preselection; and describing the preselection in a media presentation description, the description of the preselection comprising references to each media component of the plurality of media components and the obtained indication.

Accordingly, the method of the invention makes it possible to select appropriately the data to be sent from a server to a client, from a client perspective, while facilitating data de-encapsulation and decoding by the client. In addition, the method of the invention makes it possible to ensure interoperability with and consistent experience among streaming clients. The media packager signals for a preselection declared in a streaming manifest whether the whole set of media components results in a single initialization segment or in a set of initialization segments, for example one per media component. This additional signaling, being available in the DASH MPD, let streaming clients know what to fetch first to be able to properly setup their decoder.

According to embodiments, the obtained indication signals that initialization data belonging to a single media component of the plurality of media components should be used for processing media data of the media components of the preselection.

According to embodiments, a reference to the single media component that initialization data should be used is predetermined.

According to embodiments, the obtained indication further signals that the media data of a media component referenced by the preselection cannot be processed independently of other media data of another media component referenced by the preselection.

According to embodiments, the obtained indication signals that initialization data from several media components of the plurality of media components should be used for processing media data of the media components of the preselection.

According to embodiments, the method further comprises publishing the media presentation description on a streaming server for diffusion to clients.

According to a second aspect of the invention there is provided a method for processing media content by a client, the media content comprising media components, each media component comprising initialization data and media data, the method being carried out by the client and comprising:

obtaining a media presentation description, the media presentation description comprising a description of a preselection of a plurality of media components, the description of the preselection comprising references to the media components of the plurality of media components and an indication of which initialization data of the plurality of media components should be used by the client to process media data of the media components of the preselection; and parsing the obtained media presentation description to get the indication of which initialization data of the plurality of media components should be used.

The second aspect of the present invention has advantages similar to the first above-mentioned aspect.

According to embodiments, the method further comprises requesting the initialization data of the plurality of media components that should be used and initializing at least one decoder of the client as a function of the initialization data of the plurality of media components that should be used.

According to embodiments, the obtained indication signals that initialization data belonging to a single media component of the plurality of media components should be used for processing media data of the media components of the preselection.

According to embodiments, the single media component that initialization data should be used is associated with a representation of a main adaptation set of adaptation sets corresponding to the media components of the plurality of media components.

According to embodiments, the obtained indication further signals that the media data of a media component referenced by the preselection cannot be processed independently of another media data of other media component referenced by the preselection.

According to embodiments, the obtained indication signals that initialization data from several media components of the plurality of media components should be used for processing media data of the media components of the preselection.

According to embodiments, the media content corresponds to partitioned media data.

According to embodiments, the media presentation description conforms the MPEG DASH standard.

According to embodiments, each media component is associated with a representation belonging to an adaptation set, each media component of the plurality of media components being associated with a representation belonging to an adaptation set different from the adaptation sets comprising the representations with which are associated the other media components of the plurality of media components.

According to a third aspect of the invention there is provided a device for providing or processing encapsulated media data, the device comprising a processing unit configured for carrying out each of the steps of the method described above.

The third aspect of the present invention has advantages similar to the first above-mentioned aspect.

According to a fourth aspect of the invention there is provided a signal carrying an information dataset for media content, the information dataset comprising a media presentation description, the media content comprising media components, each media component comprising initialization data and media data, the media presentation description comprising at least a description of a preselection of a plurality of media components of the media content and an indication of which initialization data of the plurality of media components should be used by a client to process media data of the media components of the preselection.

The fourth aspect of the present invention has advantages similar to the first above-mentioned aspect.

According to a fifth aspect of the invention there is provided a media storage device storing a signal carrying an information dataset for media content, the information dataset comprising a media presentation description, the media content comprising media components, each media component comprising initialization data and media data, the media presentation description comprising at least a description of a preselection of a plurality of media components of the media content and an indication of which initialization data of the plurality of media components should be used by a client to process media data of the media components of the preselection.

The fifth aspect of the present invention has advantages similar to the first above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 4 illustrate an example of a portion of a media presentation description describing, in particular, three adaptation sets and one preselection;

FIGS. 5, 6, and 7 illustrate examples of a portion of a media presentation description describing, in particular, three adaptation sets and one preselection and describing signalization of the initialization segments to be used, according to embodiments of the invention;

FIGS. 12 and 13 illustrates examples of steps for the interpretation, by a client, of a description of a preselection according to embodiments of the invention.

DETAILED DESCRIPTION OF THE INVENTION

Figure 1:
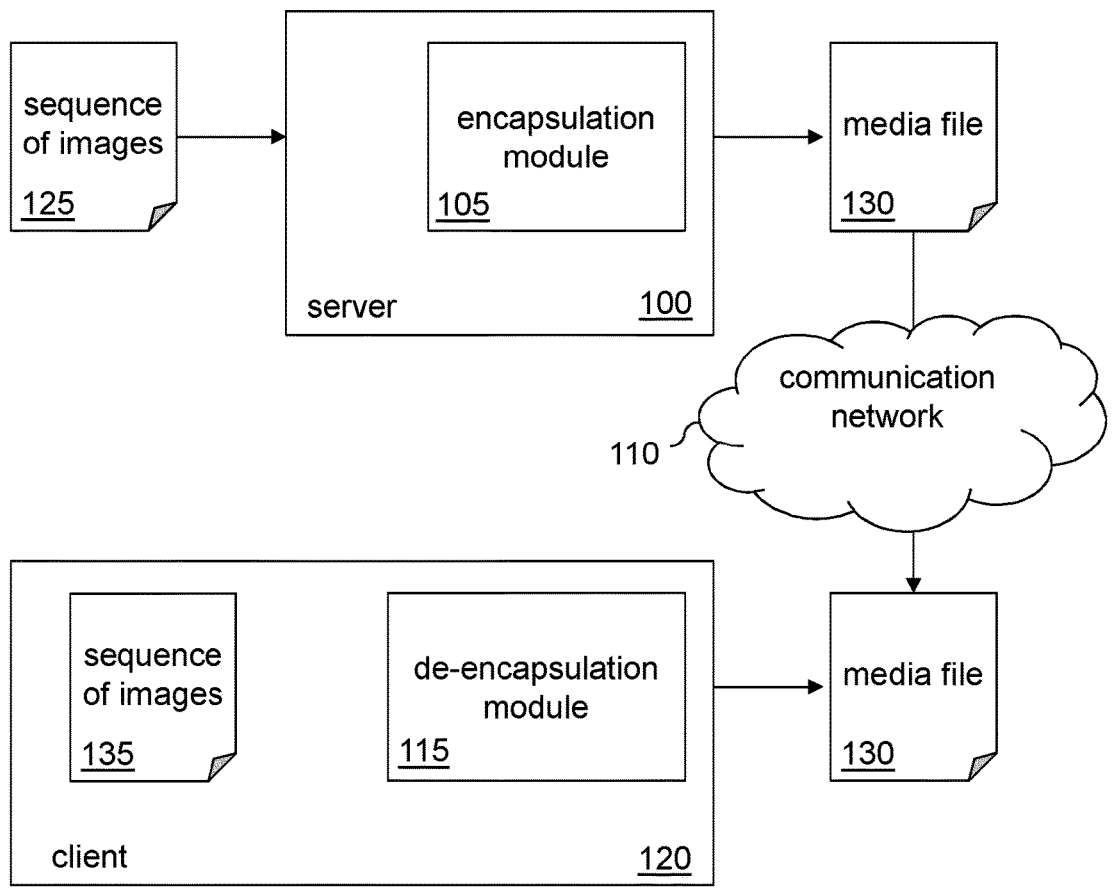
FIG. 1 illustrates an example of streaming media data from a server to a client.
Figure 2:
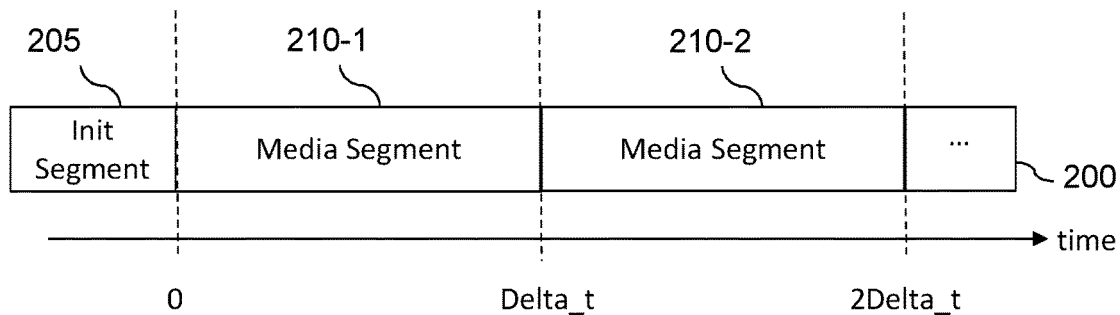
FIG. 2 illustrates an example of data streaming.

The inventors have noted that there exist advanced use cases in audio broadcasting where preselection of media components can be used and that there may be also use cases in adaptive video streaming where preselection of media components can be useful, like for example viewport dependent streaming or tile-based streaming.

In such cases, there is a specific need to select the data to be sent to a client and/or to signal the sent data. This is especially true when considering streaming of a media content as multiple streams or multiple parts. Examples of such content is multi-stream audio where several audio streams (music, dialog in different languages, sound effects, etc.) may be used to represent an audio scene. Each audio stream, representing a portion of the audio scene, may be described as one AdaptationSet in the MPD. Then each portion may be considered as a media component of the media presentation. Another example, for video, is tiled videos or spatial portions or rectangular regions of the videos, that may be used for omnidirectional or wide angle video streaming. Each spatial portion, tile, or region may be described in the MPD as one AdaptationSet and considered as one media component of the video scene. One example of use is the viewport dependent streaming in OMAF (ISO/IEC 23090-2) or more generally tile-based streaming.

According to embodiments, the invention makes it possible to take advantage of partitioned videos, in particular of tiled videos, for adaptive streaming over HTTP, giving the possibility to clients to choose a preselection of media components, for example a preselection of spatial parts (or tiles) of videos to obtain and render a video given the client needs and the client context. This is obtained by giving the possibility to a client to choose a preselection of media components and by signaling appropriately the encapsulated data corresponding to the chosen preselection.

For the sake of illustration, many embodiments described herein are based on the HEVC standard or extensions thereof. However, embodiments of the invention also apply to other coding standards already available, such as AVC, or not yet available or developed, such as MPEG Versatile Video Coding (VVC) that is under specification. In particular embodiments, the video encoder supports tiles and can control the encoding to generate independently decodable tiles, tile sets or tile groups, also sometimes called Motion-Constrained tile sets.

It is to be recalled that a manifest, for example a MPD, is a document, typically an XML file (or even a plain text file, for HTTP Live Streaming), that describes all the media content components that can be accessed for a given media presentation. A DASH client may use the metadata provided in the MPD for the selection of media components by communication with the streaming server. Such a description may comprise the types of the media content components (for example audio, audio channel, video, audio-video, portions of a video, metadata, or text), the duration of the media segments, and the addresses (e.g. the URL) associated with the media segments, that is to say the addresses from which the media content components can be obtained. The media content components can be described as alternative versions of the same content or as parts of a same content (for example spatial parts, regions of interest or tiles of a video with spatial relationship descriptor (SRD) or a viewport in virtual reality or omnidirectional media content) or as parts of a "media experience" that describes content components intended to be presented or displayed together.

Figure 3:
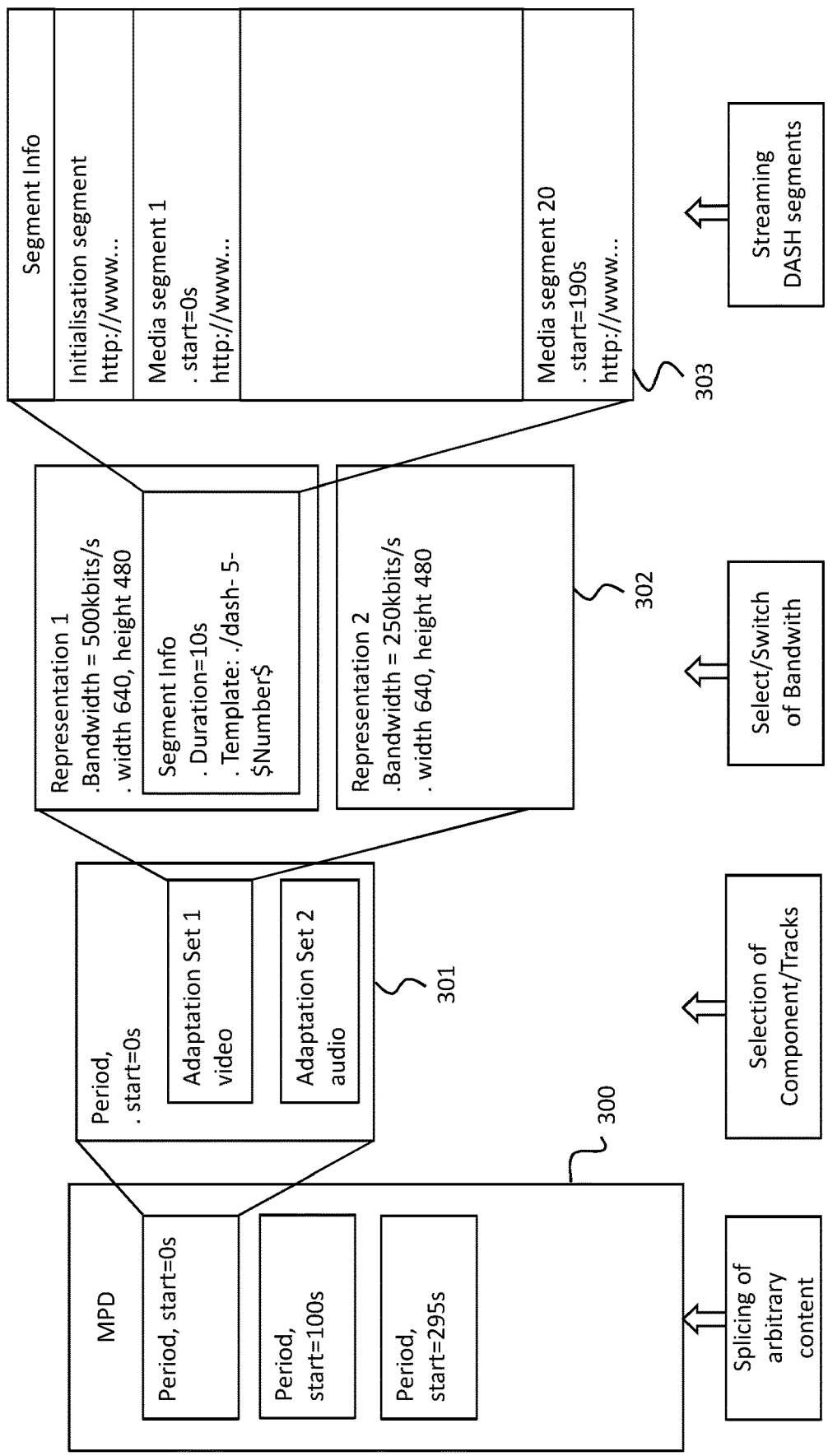
FIG. 3 illustrates a typical description of a media presentation in DASH according to the MPEG DASH specification.

Typically, an MPD is based on a hierarchical data model as depicted in FIG. 3.

FIG. 3 illustrates a typical description of a media presentation in DASH according to the MPEG DASH specification.

As illustrated, it mainly consists in one or several periods, denoted 300, that are each described by a Period element, each Period element having a starting time and duration. In turn, each Period element mainly consists in one or several Adaptation Set elements, denoted 301.

An Adaptation Set element provides information about one or multiple media content components and its various encoded alternatives as illustrated with reference 302. Each encoded alternative of the same media content component is referred to as a Representation that typically consists in one or several media and/or initialization segments denoted 303.

As described above, it may be useful to create sets of media components that can be chosen by a user according to its need and to its context (e.g. in terms of bandwidth and processing resources). A set of media components comprises several media components, a media component being, for example, segments associated with a particular representation of a particular adaptation set, for example the segments denoted 303 in FIG. 3, corresponding to Representation 1 of Adaptation Set 1.

FIG. 4 illustrates an example of a portion of a media presentation description describing, in particular, three adaptation sets and one preselection. A preselection is a subset of media components, typically a combination of AdaptationSets, in a bundle, that are expected to be consumed jointly. A bundle is a set of media components which may be consumed jointly by a single decoder instance. There may be multiple Preselections in a MPD. In such a case, a client determines which one better fits its need or capabilities according to some Preselection attributes or descriptors (e.g. Role, Rating, etc.).

Each of the adaptation sets (denoted 405-1 to 405-3 in FIG. 4) of the media presentation description (denoted 400 in FIG. 4) may contain one or more alternative representations, as described by reference to FIG. 3, each representation being described as a list of segments with at least one initialization segment and one or more media segments (each of which being accessible via a given URL).

As illustrated, media presentation description 400 further contains a declaration of a preselection (Preselection 410 in FIG. 4) that contains, in the illustrated example, the three AdaptationSets.

For the sake of illustration, it is assumed that AdaptationSet 405-1 is the main AdaptationSet in the Preselection since it is the first that is declared in the list of media components of the Preselection (using the preselectionComponents attribute). AdaptationSets 405-2 and 405-3 are partial AdaptationSets (in opposition to the main AdaptationSet).

It is observed that from the portion of manifest illustrated in FIG. 4, a client may not be able to determine the correct segment concatenation expected by the decoder. In particular, a client cannot determine which initialization segments should be downloaded and used when playing the Preselection (i.e. does the client need a concatenation of each initialization segment of AdaptationSets 405-1 to 405-3? Or does it need only the initialization segment from the main adaptation set, i.e. AdaptationSet 405-1?). In addition, it is noted that a client may also select only the adaptation set having identifier id=1, the adaptation set having identifier id=2, or the adaptation set having identifier id=3 as a media stream to be played alone. Then, the usual concatenation of the initialization segment followed by one or more media segments shall also lead to a compliant bit-stream.

Figure 5:
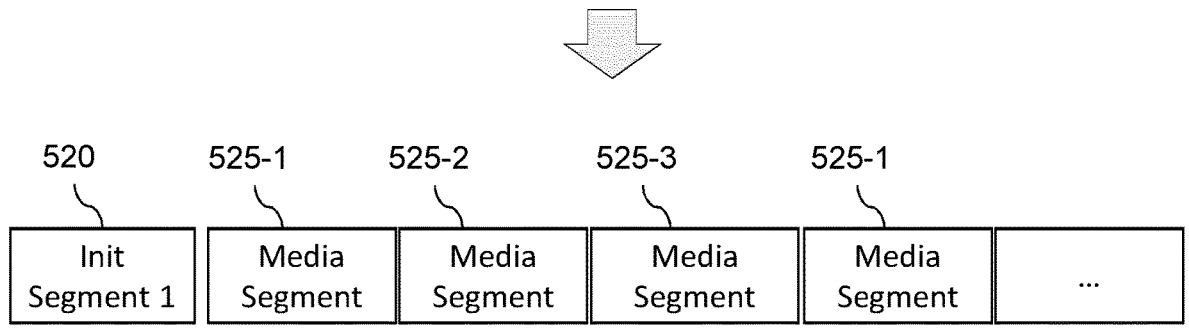

FIG. 5 illustrates a first example of a portion of a media presentation description describing, in particular, three adaptation sets and one preselection and describing signalization of the initialization segment to be used, according to embodiments of the invention.

As illustrated, media presentation description 500 contains three adaptation sets denoted 505-1 to 505-3 that are similar to the three AdaptationSets 405-1 to 405-3 described in reference to FIG. 4.

Media presentation description 500 further contains a preselection denoted 510 that is extended, in comparison with Preselection 410 of FIG. 4, with a new attribute called, for example, "init" and denoted 515. This attribute aims at describing an initialization mode for the Preselection.

According to the illustrated example, the value of this attribute indicates "preselect_only" meaning that the correct concatenation of segments for Preselection 510 is the one illustrated under media presentation description 500. In this example, only one initialization segment is relevant for the whole preselection, for example the one from one Representation of main AdaptationSet 505-1. This may be the case when the main AdaptationSet corresponds to a tile base track or to an Extractor track and when the partial adaptation sets correspond to tile tracks (e.g. 'hvt1' tile track when the video is encoded with HEVC or 'hvc1' track when each tile is encoded in an independent HEVC bit-stream).

The concatenation illustrated under media presentation description 500 shall lead to a conforming bit-stream (e.g. when encapsulated into ISOBMFF, the concatenated segments could be read by an ISOBMFF parser). It comprises an initialization segment denoted 520, for example the initialization segment of the main adaptation set (i.e. the initialization segment of AdaptationSet 505-1 in the given example) and media segments from the adaptation sets belonging to the preselection (i.e. media segments of AdaptationSets 505-1 to 505-3 in the given example) as defined with corresponding URLs denoted 525-1 to 525-3. It is noted that the URLs for the media segments are template URLs using the $time$ parameter. They could of course be template using $Number$. They could also be declared as a SegmentList, instead of SegmentTemplate without changing the invention.

According to the illustrated example, partial AdaptationSets 505-2 and 505-3 may be selectable and playable by themselves or only within a Preselection. In the former case, it means that for a given Representation in a partial AdaptationSet, the concatenation of its InitializationSegment followed by one or more corresponding MediaSegment shall lead to a conforming bit-stream.

It is to be noted that the value "preselect_only" may be defined so that it forbids the selection of the adaptation set having identifier id=1, the adaptation set having identifier id=2, or the adaptation set having identifier id=3, alone. Such definition means that the concatenation of the initialization segment followed by one or more media segments for each of these adaptation sets independently may not lead to a conforming bit-stream. Each AdaptationSet may have additional or dedicated signaling to indicate that it is not selectable (e.g. hidden) or playable outside the preselection or alone (e.g. using the OMAF's SubPicCompositionId: @noSingleSelection=true).

FIG. 6 illustrates a second example of a portion of a media presentation description describing, in particular, three adaptation sets and one preselection and describing signalization of the initialization segments to be used, according to embodiments of the invention.

As illustrated, media presentation description 600 contains three adaptation sets denoted 605-1 to 605-3 that are similar to the three AdaptationSets 405-1 to 405-3 and 505-1 to 505-3 described in reference to FIGS. 4 and 5, respectively.

Like media presentation description 500, media presentation description 600 further contains a preselection denoted 610, that comprises the same new attribute "init", denoted 615 in FIG. 6. Again, this new attribute aims at describing an initialization mode for the Preselection. The concatenation of segments for Preselection 610 is illustrated under media presentation description 600.

According to the illustrated example, the value of this attribute indicates "AS_only" which means that each AdaptationSet may be used either in Preselection 610 or independently (because the server built the segments so that their concatenation on AdaptationSet level leads to a conforming bit-stream).

This example may correspond to some audio use cases with multiple audio streams as described, for example, in digital video broadcasting (DVB) specifications. In such a case, each of the AdaptationSet 605-1 to 605-3 contains one or more Representations, each describing an audio stream. Each Representation declares an Initialization segment and one or more media segments.

According to the example illustrated in FIG. 6, the segments are concatenated per Representation or AdaptationSet (as illustrated under media presentation description 600). This means that each AdaptationSet in the Preselection has its own InitializationSegment. For example, the initialization segment of AdaptationSet 605-1 is concatenated with media segments of AdaptationSet 605-1, as defined with corresponding URL 625-1 and the initialization segment of AdaptationSet 605-3 is concatenated with media segments of AdaptationSet 605-3, as defined with corresponding URL 625-3 (this is same for AdaptationSet 605-2 and for any Adaptation Set declared in a Preselection). Then, these streams may be provided to an encoder interface merging these individual streams into a multi-stream (e.g. a MPEG-H 3D audio stream for audio streams as in ISO/IEC 23008-3).

The AdaptationSet-based concatenations depicted with reference 620 shall each lead to a compliant bitstream. A preselection with an initialization mode attribute set to "AS_only" does not prevent each AdaptationSet to be selected and played alone, outside a Preselection.

FIG. 7 illustrates a third example of a portion of a media presentation description describing, in particular, three adaptation sets and one preselection and describing signalization of the initialization segments to be used, according to embodiments of the invention.

As illustrated, media presentation description 700 contains three adaptation sets denoted 705-1 to 705-3 that are similar to those described in reference to FIGS. 4, 5, and 6.

Like media presentation descriptions 500 and 600, media presentation description 700 further contains a preselection denoted 710, that comprises the same new attribute "init", denoted 715 in FIG. 7. Again, this new attribute aims at describing an initialization mode for the Preselection. The possible concatenations of segments for Preselection 710 are illustrated under media presentation description 700.

According to the illustrated example, the value of this attribute indicates "preselect_or_AS" which means that concatenations 750 or 761 to 763 all lead to a conforming bit-stream. The concatenation 750 corresponds to the streaming of the media components or media portions within the Preselection (i.e. one single Initialization Segment, from the main AdaptationSet, followed by the successive concatenations of the media segments 725-1, 725-2, 725-3, etc. from the AdaptationSets of the Preselection). The concatenations 761 to 763 correspond to the streaming of one media component alone, i.e. outside the Preselection. As an example, 761 to 763 could each correspond to one region of interest in a video stream encoded and provided as an independent bitstream, track, or Representation. The encapsulation 750 may correspond to these regions of interest composed together in the original video stream.

Figure 8:
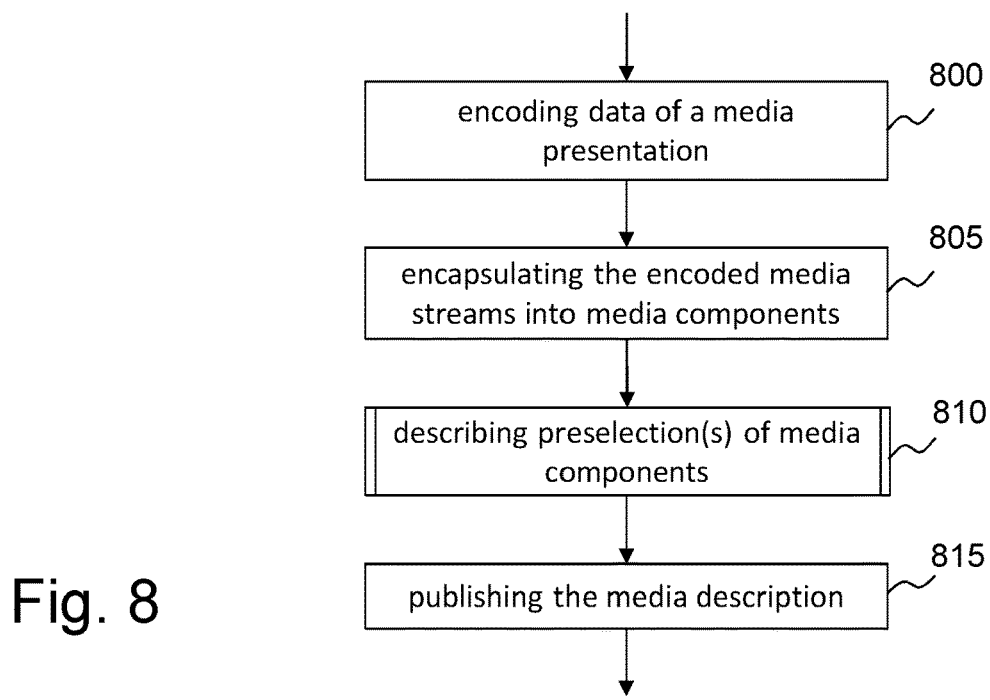
FIG. 8 illustrates an example of steps of a method for a media server to package and prepare streaming of media data having multiple components, according to embodiments of the invention.

FIG. 8 illustrates an example of steps of a method for a server to package and prepare streaming of media data having multiple media components, according to embodiments of the invention.

As illustrated, a first step (step 800) is directed to data encoding, typically data compressing, in one or more bitstreams that are encapsulated into several media components (step 805), for example into several ISOBMFF tracks. The encapsulate media components, or some subsets of these encapsulate media components, can be combined according to different combinations. Some of these combinations are identified as being particularly relevant and thus, may be proposed as preselections.

To enable a client to choose a preselection (i.e. a predetermined combination of media components), these preselections are indicated by the server in the media presentation description (step 810). By doing so, the server simplifies the possible choices for streaming clients for media data selection. Moreover, the definition of Preselections better describes the intention of the content creator, providing preferred entry points in the media presentation. To that end, the server puts annotation in the media presentation description to define rules for initialization segments.

Figure 9:
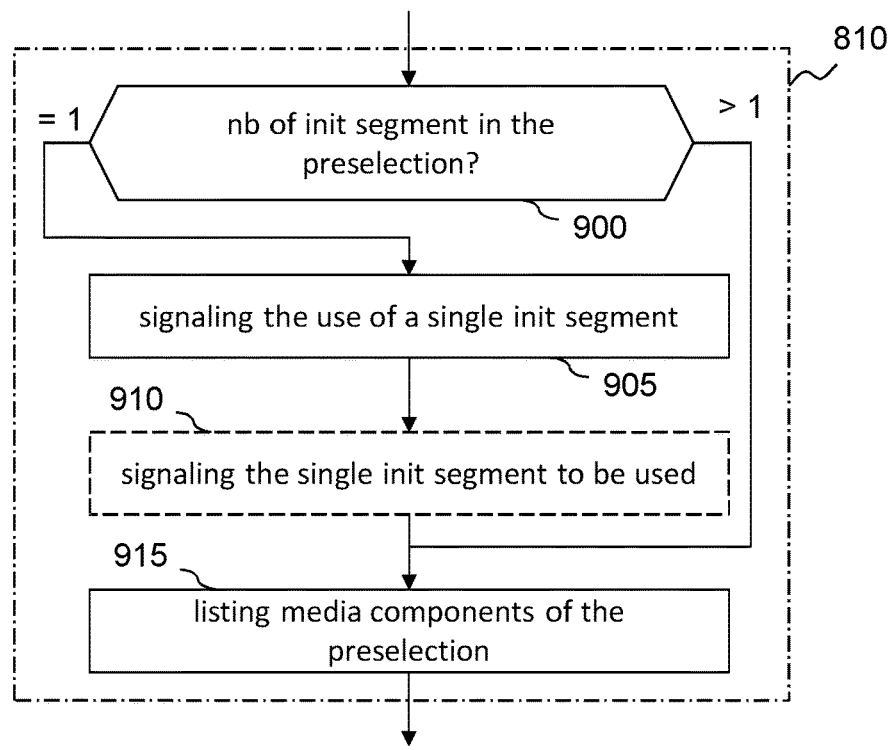
FIGS. 9 and 10 illustrate examples of steps performed by a server to describe the expected behavior of a streaming client regarding a Preselection and AdaptationSets declared within a Preselection, in particular for signaling initialization segments to use.
Figure 10:
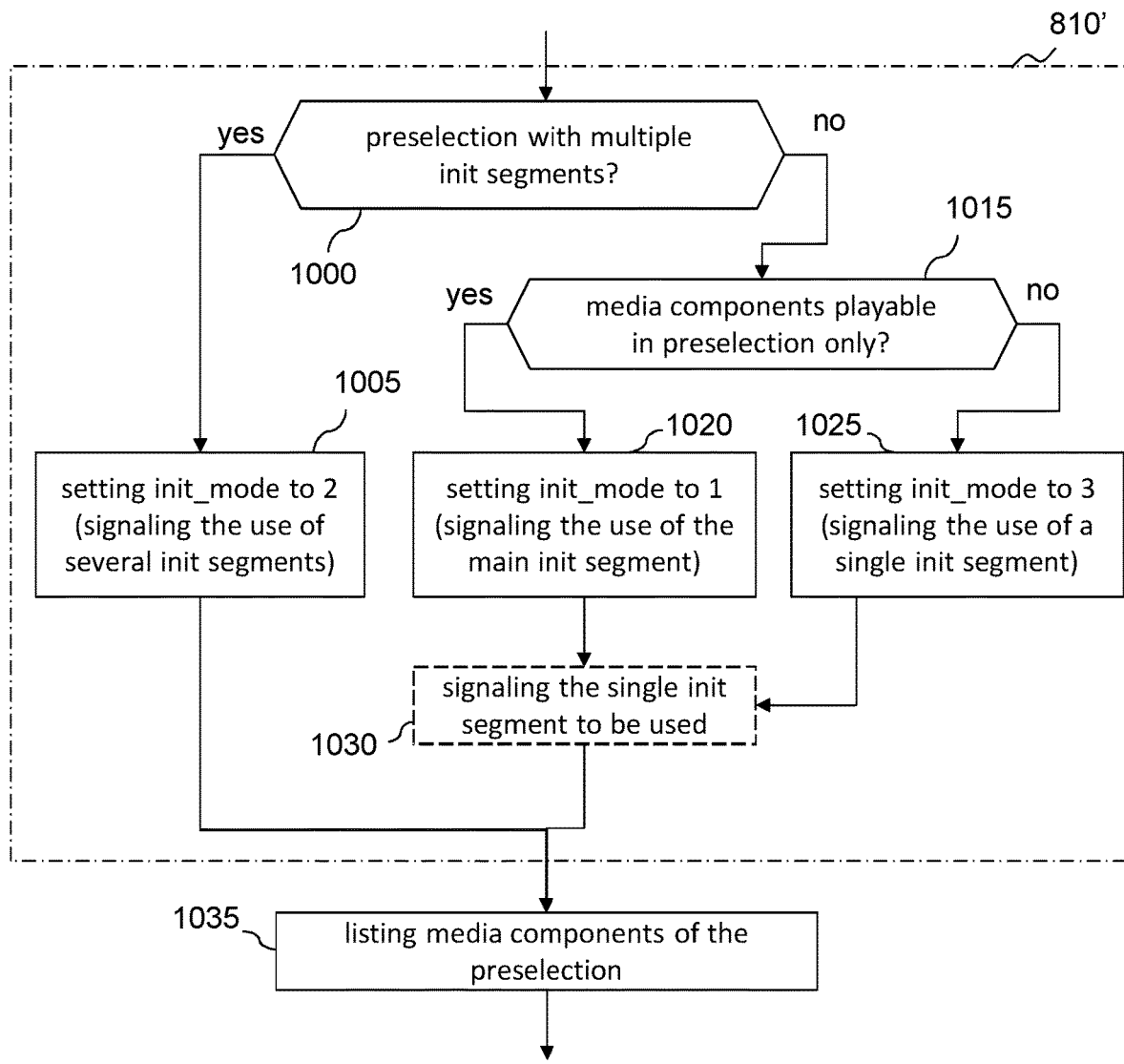

FIGS. 9 and 10 provide examples of signaling preselections in a media presentation description.

Next, the media files or segments with their description are published on a streaming server for diffusion to clients (step 815).

FIG. 9 illustrates a first example of steps performed by a server to describe the expected behavior of a streaming client regarding a Preselection and AdaptationSets declared within a Preselection, in particular for signaling initialization segments to use, as described by reference to step 810 in FIG. 8.

As illustrated, a first step (step 900) is directed to determining whether the considered Preselection shall be used with a single initialization segment or not, that is to say if the number of initialization segments to use is equal to or greater than one. This depends on the content. For example, for tiled videos, the test may be true and for multiple audio streams, the test may be false.

If the considered Preselection shall be used with a single initialization segment, the server module in charge of writing the media presentation description adds an attribute in the Preselection element to indicate that only one initialization segment is to be used (step 905). By default, i.e. when no indication is given in the Preselection for which a single initialization segment shall be used, the initialization to be used is the Initialization Segment from the main AdaptationSet. According to embodiments, if the initialization segment to be used is not the one from the main AdaptationSet, the initialization segment to be used is signaled (step 910). For example, this may be signaled using another attribute "initSegment" in the Preselection element. The new "initSegment" attribute shall provide one AdaptationSet's id present in the list of AdaptationSet ids declared in the preselectionComponents attribute:
<Preselection single_init="true" preselectionComponents=" 1 2 3 initSegment="2" . . . />.

In this example, the single initialization segment to use for concatenation of the segments of the media components of the Preselection is the initialization segment from the AdaptationSet with id="2".

An example of an incorrect description of the initialization segment to be used is the following:
<Preselection single_init="true" preselectionComponents=" 1 2 3 initSegment="4" . . . />.

In such a case, clients should ignore this Preselection. An MPD schema validator should not accept such declaration and should consider the MPD as invalid.

In a variant, the value of the initSegment attribute may provide the index (1-based index) in the preselectionComponents list of AdaptationSet Ids. For example in a Preselection with a preselectionComponents equal to "12 45 123", an initSegment="2" would indicate that the initialization segment AdaptationSet with id="45" should be considered.

Next, the Preselection is described with the list of media components it contains (step 915).

FIG. 10 illustrates a second example of steps performed by a server to describe the expected behavior of a streaming client regarding a Preselection and AdaptationSets declared within a Preselection, in particular for signaling initialization segments to use, as described by reference to step 810 in FIG. 8.

As illustrated, a first step (step 1000) is directed to determining whether the Preselection shall be used with several initialization segments or not. This depends on the content. Again, this depends on the application and on the nature of the media streams.

If the Preselection shall be used with several initialization segments, a value of a specific init_mode parameter is set in an attribute of the Preselection element being described (step 1005). This specific init_mode parameter value indicates that for each Representation in each AdaptationSet of the Preselection, the corresponding initialization segment shall be considered, for example as described in reference to FIG. 6 (where the init_mode is represented by the "init" attribute). For the sake of illustration, the value of the init_mode parameter may be set to 2. On the contrary, if the Preselection shall be used with a single initialization segment, the server further checks whether a partial adaptation set may be played outside the preselection (step 1015).

If a partial adaptation set may only be played in the preselection, the server sets a value of the specific init_mode parameter to a value indicating that only the Initialization Segment from the main AdaptationSet (or from another single initialization segment that would be signaled (step 1030)) should be considered (step 1020), for example as described in reference to FIG. 5, where the init_mode is represented by the "init" attribute). For the sake of illustration, the value of the init_mode parameter may be set to 1.

On the contrary, if a partial adaptation set may be played outside the preselection, a specific init_mode parameter value is set to indicate clients that the concatenations as described in reference to FIG. 7 (where the init_mode is represented by the "init" attribute) may be used and lead to a conforming bit-stream (step 1025). The initialization segment is by default the one from the main AdaptationSet or optionally the initialization segment of the AdaptationSet indicated in the initSegment attribute of the Preselection element. For the sake of illustration, the value of the init_mode parameter may be set to 3. Step 1030 of providing an initialization segment that is not the one for the main AdaptationSet may be signaled using the optional initSegment attribute described in reference to step 910 in FIG. 9.

Next, the Preselection is described with the list of media components it contains (step 1035).

As described above and according to embodiments, the Preselection element is extended with a new attribute which can be, for example, a Boolean attribute (as described in reference to FIG. 9) or an attribute taking enumerated or predefined values (as described in reference to FIG. 10).

The new attribute indicating the initialization mode may be optional and when not present, the client shall assume concatenation as described in reference to FIG. 6. The following semantics when the attribute is a Boolean (e.g. "single_init") define the new attribute of the Preselection element.

When set to true, this attribute indicates that the concatenation of the Initialization Segment of the main (optionally from the one indicated by the initSegment attribute) AdaptationSet followed by media segments of each AdaptationSet declared in the Preselection shall represent a conforming Segment sequence according to DASH Bitstream Concatenation rules and conforming to the media type as specified in the @mimeType attribute for this Representation. It is recalled that the media segments may be concatenated in any order, not necessarily the declaration order in the Preselection.

When set to false or not present, this attribute indicates that each concatenation of initialization segment and media segments of each AdaptationSet in the Preselection shall represent a conforming Segment sequence according to DASH Bitstream Concatenation rules and conforming to the media type as specified in the @mimeType attribute for this Representation.

It is also to be noted that the Representations of each partial AdaptationSet declared in the Preselection may or may not lead to a conformant sequence of segments. This may be determined by looking at presence or not of a Preselection descriptor. If an Essential Property descriptor is present, then the AdaptationSet cannot be selected and played outside a Preselection. When present as a SupplementalProperty, the AdaptationSet may be selected and played outside a Preselection.

The XML schema of the PreselectionType may be updated as follows (optional attributes in bold):

```
<xs:complexType name="PreselectionType">
  <xs:complexContent>
    <xs:extension base="RepresentationBaseType">
      <xs:sequence>
        <xs:element name="Accessibility" type="DescriptorType" minOccurs="0" maxOccurs="unbounded"/>
        <xs:element name="Role" type="DescriptorType" minOccurs="0" maxOccurs="unbounded"/>
        <xs:element name="Rating" type="DescriptorType" minOccurs="0" maxOccurs="unbounded"/>
        <xs:element name="Viewpoint" type="DescriptorType" minOccurs="0" maxOccurs="unbounded"/>
      </xs:sequence>
      <xs:attribute name="id" type="StringNoWhitespaceType" default="1"/>
      <xs:attribute name="preselectionComponents" type="StringVectorType" use="required"/>
      <xs:attribute name="lang" type="xs:language"/>
      <xs:attribute name="single_init" type="xs:Boolean"/>
      <xs:attribute name="InitSegment" type="StringNoWhitespaceType"/>
    </xs:extension>
  </xs:complexContent>
</xs:complexType>
```

As described above (in particular in referent to FIGS. 5, 6, and 7), examples of explicit values for the new Preselection's attribute are the followings: "preselect_only" or "AS_only", or "preselect_or_AS". These values may be encoded with values 1, 2, and 3, each corresponding to one of the three initialization modes. Naturally, in case new applications would require additional values, this mechanism could easily be extended by reserving additional values (this would not be the case by using a Boolean attribute).

In this variant, the XML schema of the PreselectionType may be updated as follows (optional attributes in bold):

```
<xs:complexType name="PreselectionType">
  <xs:complexContent>
    <xs:extension base="RepresentationBaseType">
      <xs:sequence>
        <xs:element name="Accessibility" type="DescriptorType" minOccurs="0" maxOccurs="unbounded"/>
        <xs:element name="Role" type="DescriptorType" minOccurs="0" maxOccurs="unbounded"/>
        <xs:element name="Rating" type="DescriptorType" minOccurs="0" maxOccurs="unbounded"/>
        <xs:element name="Viewpoint" type="DescriptorType" minOccurs="0" maxOccurs="unbounded"/>
      </xs:sequence>
      <xs:attribute name="id" type="StringNoWhitespaceType" default="1"/>
      <xs:attribute name="preselectionComponents" type="StringVectorType" use="required"/>
```

-continued

```
    <xs:attribute name="lang" type="xs:language"/>
    <xs:attribute name= "InitMode" type="InitalizationModeType"
default="AS_only"/>
    <xs:attribute name="InitSegment" type= "StringNoWhitespaceType" />
    </xs:extension>
  </xs:complexContent>
</xs:complexType>
``` with the InitializationModeType being defined as follows:

```
<xs:simpleType name=" InitializationModeType ">
  <xs:restriction base="xs:string">
    <xs:enumeration value="preselect_only"/>
    <xs:enumeration value="AS_only"/>
    <xs:enumeration value="preselect_or_AS"/>
  </xs:restriction>
</xs:simpleType>
```

The semantics for the different initialization modes that can be declared in a Preselection is defined as follows:

The initMode attribute indicates the concatenation rules to be applied by a DASH client. When value is "preselect-only", or any value to indicate that only one initialization segment from one AdaptationSet in the Preselection shall be used, the concatenation of the Initialization Segment of the main AdaptationSet (optionally from the one indicated by the initSegment attribute) followed by media segments of each AdaptationSet declared in the Preselection shall represent a conforming Segment sequence according to DASH Bitstream Concatenation rules and conforming to the media type as specified in the @mimeType attribute for this Representation. It is recalled that the media segments may be concatenated in any order, not necessarily the declaration order in the Preselection. Moreover, this value indicates that the AdaptationSets may not be selected or played outside the Preselection, i.e. the concatenation on each AdaptationSet basis of the InitializationSegment and a sequence of MediaSegments may not lead to a conforming bitstream.

When value is "AS_only", or any value to indicate that each AdaptationSet shall use its own initialization segment, each concatenation of initialization segment and media segments of each AdaptationSet in the Preselection shall represent a conforming Segment sequence according to DASH Bitstream Concatenation rules and conforming to the media type as specified in the @mimeType attribute for this Representation.

When value is set to "Preselect_or_AS", the concatenation of initialization segment and media segments of each AdaptationSet in the Preselection shall represent a conforming Segment sequence and the concatenation of the Initialization Segment of the main AdaptationSet (optionally from the one indicated by the initSegment attribute) followed by media segments of each AdaptationSet declared in the Preselection shall represent a conforming Segment sequence. A conforming Segment Sequence, according to DASH rules lead to a conforming bitstream.

The Preselection descriptor may also be extended with these new attributes where the same semantics as for the Preselection element would apply.

Figure 11:
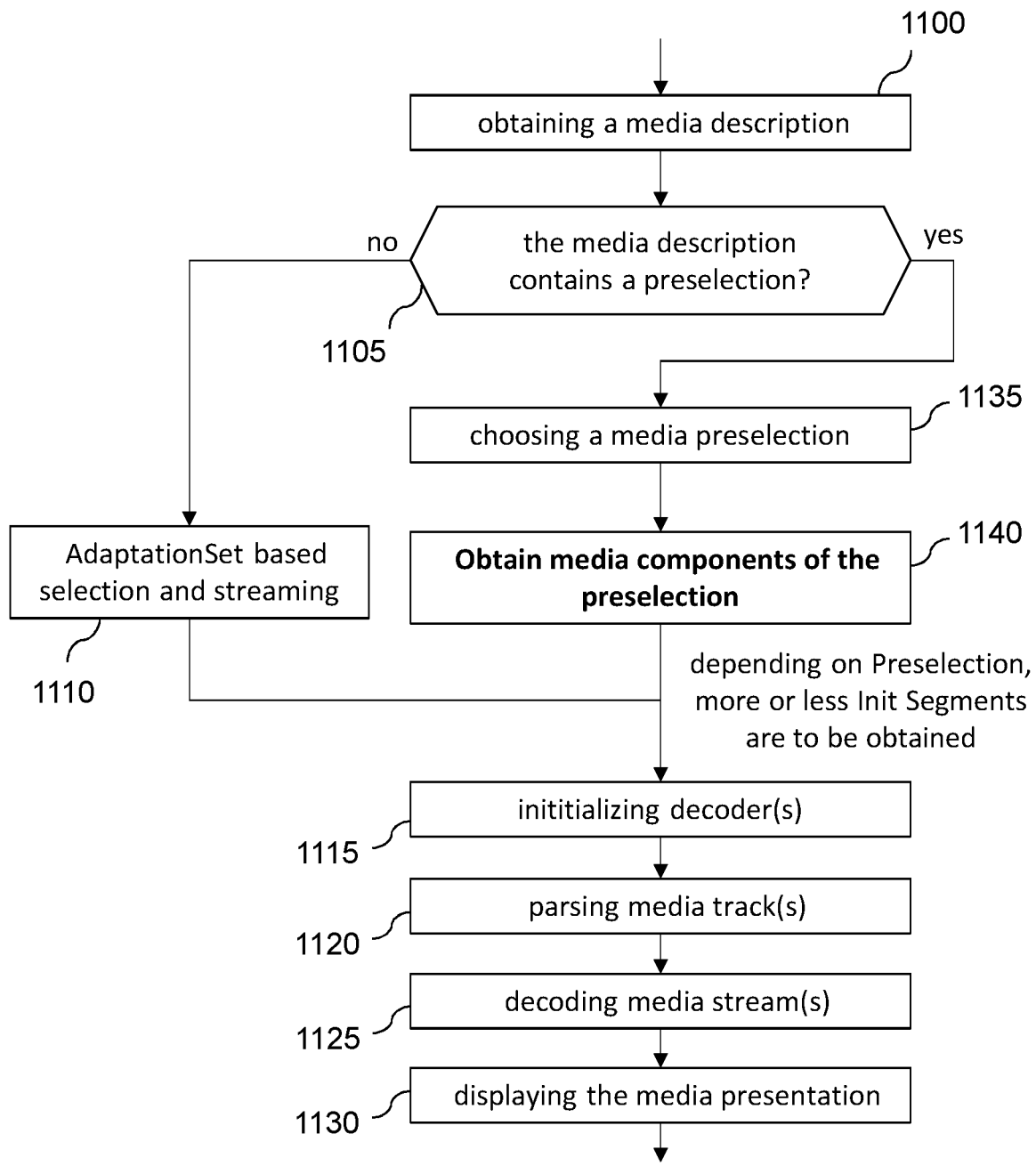
FIG. 11 illustrates an example of steps for a client to process media data upon receiving a streaming manifest according to embodiments of the invention.

FIG. 11 illustrates an example of steps for a client to process media data upon receiving a streaming manifest according to embodiments of the invention.

After obtaining a media presentation description (step 1100), the client checks whether the media presentation description contains a preselection or not (1105). If there is no preselection, the client runs a standard content selection and adaptive streaming, based on independent Adaptation-Sets (step 1110). The client initialized its decoder(s) (step 1115), parses the media component(s), for example the media track(s) (step 1120), decodes the media stream(s) (step 1125), and displays or stores the media presentation (step 1130).

On the contrary, if the media presentation description contains one or more preselections, the client may choose a preselection for streaming the corresponding presentation (step 1135). Next, the client parses the description of the chosen preselection to obtain the list of the media components of the preselection (step 1140). This step may provide indication on the initialization segments to consider to play the preselection.

From the obtained description, the client initializes its decoder(s) (step 1115) and, if the initialization is successful, the client then gets media segments from each Representation of the Preselection and the corresponding tracks are parsed, decoded and rendered on a user interface of the client (steps 1120 to 1130).

Examples of steps carried out during step 1140 are illustrated in FIGS. 12 and 13.

FIG. 12 illustrates a first example of steps for the interpretation, by a client, of a description of a preselection according to embodiments of the invention.

As illustrated, after the client has obtained a description of the chosen preselection (step 1200), it checks whether an attribute of the Preselection indicates that the use of a single initialization segment is signaled (step 1205).

If an attribute of the Preselection indicates that the use of a single initialization segment is signaled, the client requests the initialization segment from one Representation of the main AdaptationSet (step 1210, or optionally from one AdaptationSet as indicated by a initSegment attribute) and ignores those from Representations of the partial AdaptationSets. On the contrary, if it is not signaled in the Preselection that a single initialization segment is to be used, the client requests one initialization segment per AdaptationSet declared in the Preselection (step 1215).

These initialization segments are then processed by the parsing/de-encapsulation module of the client to provide information to media decoder(s) and perform their setup or initialization. The client may assume that any AdaptationSet from the Preselection may be selectable and playable by itself. Each AdaptationSet may also have a PreselectionDescriptor indicating whether a client shall support or not the Preselection to be able to select and play this AdaptationSet as described in reference to FIG. 9.

FIG. 13 illustrates a second example of steps for the interpretation, by a client, of a description of a preselection according to embodiments of the invention in the case according to which the attribute signaling the initialization segment(s) to be used can take explicit values for the initialization mode (e.g. "init" or "initMode" attribute).

As illustrated, after obtaining a description of the chosen preselection (step 1300), the client reads from the preselection element description the value of the attribute providing information on the initialization mode, for example the "init" or "init_mode" attribute (step 1305).

If the value indicates "preselect_only", i.e. a preselection only mode, the client requests the initialization segment from one Representation of the main AdaptationSet (step 1310, or optionally from one AdaptationSet as indicated by a initSegment attribute) and ignores those from Representations of the partial AdaptationSets. On the contrary, if the value does not indicate a preselection only mode, the client checks whether the value indicates an initialization segment per AdaptationSet (step 1315).

If the value indicates an initialization per AdaptationSet, i.e. "AS_only", the client requests one initialization segment per AdaptationSet declared in the Preselection (step 1320). On the contrary, if the value does not indicate a preselection only mode and does not indicate an initialization per AdaptationSet, i.e. "AS_only", the client may decide to play any Adaptation Set from the Preselection or the whole Preselection (step 1325). In the former case, it only needs the initialization segment for one Representation of the selected AdaptationSet. In the latter case, it only needs to get the initialization segment of one Representation in the main AdaptationSet (or optionally from one AdaptationSet as indicated by a initSegment attribute).

These initialization segments are then processed by the parsing/de-encapsulation module of the client to provide information to media decoder(s) and perform their setup or initialization.

Figure 14:
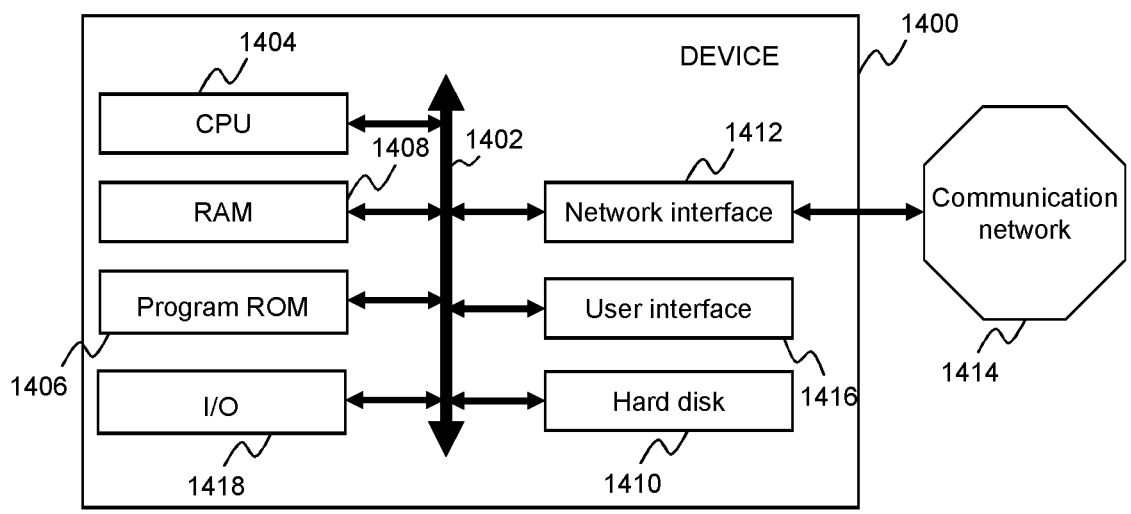
FIG. 14 schematically illustrates a processing device configured to implement at least one embodiment of the present invention.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus 1402 connected to:
- a central processing unit (CPU) 1404, such as a microprocessor;
- a random access memory (RAM) 1408 for storing the executable code of the method of embodiments of the invention as well as the registers adapted to record variables and parameters necessary for implementing the method for transmitting media data, the memory capacity thereof can be expanded by an optional RAM connected to an expansion port for example;
- a read only memory (ROM) 1406 for storing computer programs for implementing embodiments of the invention;
- a network interface 1412 that is, in turn, typically connected to a communication network 1414 over which digital data to be processed are transmitted or received. The network interface 1412 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1404;
- a user interface (UI) 1416 for receiving inputs from a user or to display information to a user;
- a hard disk (HD) 1410;
- an I/O module 1418 for receiving/sending data from/to external devices such as a video source or display.

The executable code may be stored either in read only memory 1406, on the hard disk 1410 or on a removable digital medium for example such as a disk. According to a variant, the executable code of the programs can be received by means of a communication network, via the network interface 1412, in order to be stored in one of the storage means of the communication device 1400, such as the hard disk 1410, before being executed.

The central processing unit 1404 is adapted to control and direct the execution of the instructions or portions of software code of the program or programs according to embodiments of the invention, which instructions are stored in one of the aforementioned storage means. After powering on, the CPU 1404 is capable of executing instructions from main RAM memory 1408 relating to a software application after those instructions have been loaded from the program ROM 1406 or the hard-disc (HD) 1410 for example. Such a software application, when executed by the CPU 1404, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "and" does not exclude a plurality. The mere fact that different features are recited in mutually different dependent claims does not indicate that a combination of these features cannot be advantageously used.

The invention claimed is:

1. A method of generating a Media Presentation Description (MPD) by a server, the method comprising:
    obtaining an item of information for identifying a concatenation rule to be used for processing a preselection of a plurality of media components, each media component comprising media data; and
    generating the Media Presentation Description describing the preselection, the Media Presentation Description comprising references to each media component of the preselection and comprising the obtained item of information,
    the concatenation rule characterizes which media components from the preselection, the indicated media components comprising initialization data, from which the initialization data is concatenated with the media data of the plurality of media components of the preselection to generate a conforming bitstream, wherein the initialization data is from a plurality of initialization data.

2. The method of claim 1, wherein the concatenation rule signals that initialization data belonging to a single media component of the plurality of media components should be used for processing media data of the media components of the preselection.

3. The method of claim 2, wherein a reference to the single media component that initialization data should be used is predetermined.

4. The method of claim 2, wherein the Media Presentation Description comprises data for indicating whether the media data of a media component referenced by the preselection can be processed independently of other media data of another media component referenced by the preselection, or not.

5. The method of claim 1, wherein the concatenation rule signals that initialization data from several media components of the plurality of media components should be used for processing media data of the media components of the preselection.

6. The method of claim 1, wherein the described preselection references a set of Representations from a plurality of Adaptation Sets, wherein each Adaptation Set of the plurality describes one or more media components.

7. The method of claim 6, wherein the item of information for identifying a concatenation rule signals that initialization data belonging to a first Adaptation Set of the described preselection should be used by a client, wherein the initialization data should be concatenated with media data of other Adaptation Sets comprised in the described preselection, the other Adaptation Sets being different from the first Adaptation Set.

8. The method of claim 1, wherein the initialization data corresponds to an initialization segment and wherein the media data corresponds to one or several media segments.

9. The method of claim 8, wherein the initialization segment comprises a Movie box, wherein the media segment comprises a Movie Fragment box and a Media Data box.

10. A non-transitory computer-readable storage medium storing instructions of a computer program for implementing each of the steps of the method according to claim 1.

11. A device for generating a Media Presentation Description or for processing encapsulated media data, the device comprising a processing unit configured for carrying out each of the steps of the method according to claim 1.

12. A method for processing media content by a client, the media content comprising media components, the method being carried out by the client and comprising:

obtaining a media presentation description, the media presentation description comprising a description of a preselection of a plurality of media components, the description of the preselection comprising references to the media components of the plurality of media components and an item of information for identifying a concatenation rule to be used for processing the preselection; and parsing the obtained media presentation description to get the item of information for identifying the concatenation rule, wherein the concatenation rule characterizes which media components from the preselection, the indicated media components comprising initialization data, from which the initialization data is concatenated with the media data of the plurality of media components of the preselection to generate a conforming bitstream, wherein the initialization data is from a plurality of initialization data.

13. The method of claim 12, wherein the method further comprising identifying initialization data of the plurality of media components, as a function of the concatenation rule, requesting the identified initialization data, and initializing at least one decoder of the client as a function of the identified initialization data.

14. The method of claim 13, wherein the concatenation rule signals that initialization data belonging to a single media component of the plurality of media components should be used for processing media data of the media components of the preselection.

15. The method of claim 14, wherein the concatenation rule further signals that the media data of a media component referenced by the preselection cannot be processed independently of another media data of other media component referenced by the preselection.

16. The method of claim 12, wherein the described preselection references a set of Representations from a plurality of Adaptation Sets, wherein each Adaptation Set of the plurality describes one or more media components.

* * * * *